US010592576B1

(12) United States Patent
McCurley et al.

(10) Patent No.: US 10,592,576 B1
(45) Date of Patent: *Mar. 17, 2020

(54) CROWDSOURCING DESCRIPTOR SELECTION

(71) Applicant: Google LLC, Mountain View, CA (US)

(72) Inventors: Kevin Snow McCurley, San Jose, CA (US); Dandapani Sivakumar, Cupertino, CA (US)

(73) Assignee: Google LLC, Mountain View, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 15/218,314

(22) Filed: Jul. 25, 2016

Related U.S. Application Data

(63) Continuation of application No. 13/957,315, filed on Aug. 1, 2013, now Pat. No. 9,426,190.

(51) Int. Cl.
| | |
|---|---|
| *G06F 16/953* | (2019.01) |
| *G06F 16/95* | (2019.01) |
| *G06F 16/2457* | (2019.01) |
| *G06F 3/0482* | (2013.01) |
| *G06F 17/27* | (2006.01) |
| *G06F 17/30* | (2006.01) |

(Continued)

(52) U.S. Cl.
CPC ........ *G06F 16/9566* (2019.01); *G06F 3/0482* (2013.01); *G06F 16/24578* (2019.01); *G06F 16/9535* (2019.01); *H04L 67/10* (2013.01); *G06F 17/27* (2013.01); *G06F 17/2705* (2013.01); *G06Q 50/01* (2013.01); *H04L 65/403* (2013.01)

(58) Field of Classification Search
CPC ....... H04L 65/403; H04L 67/10; G06F 17/27; G06F 17/2705; G06F 17/3005; G06F 17/30011; G06F 17/30058; G06F 3/0482; G06F 3/0481; G06F 16/9566; G06F 16/9535; G06F 16/24578; G06Q 50/01
See application file for complete search history.

(56) References Cited

U.S. PATENT DOCUMENTS 9,813,260 B1 * 11/2017 Morgan ................ H04L 12/581
9,990,114 B1 * 6/2018 Horton ................ G06F 3/04842
(Continued)

OTHER PUBLICATIONS

USPTO, Office Action for U.S. Appl. No. 13/957,315, dated Aug. 26, 2015.
(Continued)

*Primary Examiner* — Ting Z Lee
(74) *Attorney, Agent, or Firm* — Lowenstein Sandler LLP

(57) ABSTRACT

Implementations disclose crowdsourcing descriptor selection. A method includes receiving, by a processor, a reference to an internet resource from a device, wherein the reference to the internet resource is a uniform resource locator (URL) provided in a post interface, wherein the post interface presents posts to a social network, determining, by the processor, a plurality of descriptors indicative of content within the internet resource, sending, by the processor, the plurality of descriptors to the device for presentation in the post interface according to a priority order, receiving, via the post interface a selection of one of the plurality of descriptors, and generating, by the processor, a post to the social network, the generated post comprising the selected one of the plurality of descriptors.

20 Claims, 9 Drawing Sheets

(51) Int. Cl.
*G06Q 50/00* (2012.01)
*G06F 16/955* (2019.01)
*H04L 29/08* (2006.01)
*G06F 16/9535* (2019.01)
*H04L 29/06* (2006.01)

(56) References Cited

U.S. PATENT DOCUMENTS

| | | | |
|---|---|---|---|
| 2010/0064018 A1* | 3/2010 | Luo | G06F 17/30905 |
| | | | 709/206 |
| 2011/0197162 A1 | 8/2011 | Paulik et al. | |
| 2011/0231383 A1 | 9/2011 | Smyth et al. | |
| 2011/0283210 A1 | 11/2011 | Berger et al. | |
| 2012/0072835 A1* | 3/2012 | Gross | G06Q 10/10 |
| | | | 715/243 |
| 2012/0084644 A1 | 4/2012 | Robert et al. | |
| 2012/0151383 A1 | 6/2012 | Kazan et al. | |
| 2013/0290149 A1 | 10/2013 | Rashwan | |
| 2014/0201178 A1* | 7/2014 | Baecke | G06F 17/30038 |
| | | | 707/706 |
| 2015/0281138 A1* | 10/2015 | Niu | H04L 51/02 |
| | | | 709/206 |

OTHER PUBLICATIONS

USPTO, Final Office Action for U.S. Appl. No. 13/957,315, dated Feb. 10, 2016.
Notice of Allowance for U.S. Appl. No. 13/957,315, dated Apr. 25, 2016.

\* cited by examiner

CROWDSOURCING DESCRIPTOR SELECTION

CROSS-REFERENCE TO RELATED APPLICATIONS

This patent application is a continuation of U.S. Non-Provisional application Ser. No. 13/957,315, filed Aug. 1, 2013, entitled "CROWDSOURCING DESCRIPTOR SELECTION," which is incorporated herein by reference for all purposes.

BACKGROUND

The disclosure relates to methods, systems, and computer programs for crowdsourcing descriptor selection.

In recent years, the proliferation of the Internet has brought about significant changes in the ways users are able to interact with content and with each other. One example entails the sharing of internet resources on social networks. Through interfaces for generating posts on social networks, users are able to share internet resources such as web pages and media to their social graphs.

SUMMARY

Implementations of the disclosure provide methods, systems, and computer programs for crowdsourcing descriptor selection. It should be appreciated that the disclosure can be implemented in numerous ways, e.g., a process, an apparatus, a system, a device or a method on a computer readable medium. Several implementations of the disclosure are described below.

In accordance with some implementations, a method is provided, including the following method operations: receiving from a client a reference to an internet resource; identifying a plurality of descriptors from the internet resource; determining a priority order for the plurality of descriptors; sending the plurality of descriptors to the client for presentation according to the priority order in a post interface for generating a post to a social network; receiving from the post interface a request to generate the post to the social network, the request defining a selection of one of the descriptors; generating the post to the social network, the generated post including the selected one of the descriptors; wherein the method is executed by at least one processor.

In some implementations, the reference to the internet resource is received from the post interface or from a presentation of the internet resource on the client device.

In some implementations, the reference to the internet resource is defined by a uniform resource locator (URL).

In some implementations, each of the plurality of descriptors is defined by a portion of text extracted from the internet resource. In some implementations, a descriptor may be defined by a region selected from an image or an excerpt selected from a video.

In some implementations, each of the plurality of descriptors has an associated popularity metric; wherein generating the post includes processing the selection of the one of the descriptors to update the popularity metric associated with the selected one of the descriptors.

In some implementations, the priority order for the plurality of descriptors is based on the popularity metrics associated with the plurality of descriptors.

In some implementations, the method further includes retrieving features associated with an identified user; wherein the priority order for the plurality of descriptors is based on the features associated with the identified user.

In some implementations, the features associated with the identified user include one or more of age, gender, and location.

In some implementations, the method includes receiving from the post interface user-defined text; and adjusting the priority order for the plurality of descriptors based on the user-defined text.

In some implementations, the method includes updating a search index defined for the internet resource based on the selected one of the descriptors. In some implementations, updating the search index includes assignment or adjustment of weighting for one or more search terms associated with the internet resource, the assignment or adjustment being based on popularity of descriptors of the internet resource according to user selection. In some implementations, updating the search index includes updating a selection of snippets utilized to describe the internet resource as a search result.

In other implementations, an intranet resource, or any other type of networked resource, is referenced.

In accordance with some implementations, a method is provided, including the following method operations: receiving a request to share a content page in a post to a social network site; analyzing the content page to identify a plurality of descriptive content; presenting a draft post, the draft post providing options for associating particular ones of the descriptive content for integration with the post; receiving a selection of at least one of the particular ones of the descriptive content; generating the post to the social network site based on the selection; wherein the method is executed by at least one processor.

In some implementations, receiving the request to share the content page includes receiving and identifying a reference to the content page. In various implementations, the reference may be a URL or other identifier. In some implementations, the reference is defined from a query to a search system.

In some implementations, analyzing the content page includes identifying one or more mark-up tags in data defining the content page.

In some implementations, the method includes determining a priority order for the particular ones of the descriptive content; wherein presenting the draft post includes presenting the particular ones of the descriptive content according to the priority order.

In some implementations, determining the priority order includes identifying user features, the priority order being determined in part based on the user features.

In accordance with some implementations, a non-transitory computer readable medium having program instructions embodied thereon is provided, the program instructions including: program instructions for receiving a request to share a content page in a post to a social network site; program instructions for analyzing the content page to identify a plurality of descriptive content; program instructions for presenting a draft post, the draft post providing options for associating particular ones of the descriptive content for integration with the post; program instructions for receiving a selection of at least one of the particular ones of the descriptive content; and, program instructions for generating the post to the social network site based on the selection.

In some implementations, receiving the request to share the content page includes receiving and identifying a reference to the content page.

In some implementations, analyzing the content page includes identifying one or more mark-up tags in data defining the content page.

In some implementations, the non-transitory computer readable medium includes program instructions for determining a priority order for the particular ones of the descriptive content; wherein presenting the draft post includes presenting the particular ones of the descriptive content according to the priority order.

In some implementations, determining the priority order includes identifying user features, the priority order being determined in part based on the user features.

These and other implementations may provide one or more of the following advantages. Various implementations provide options to the user for sharing a resource in a post to a social network. More specifically, users are able to select from multiple descriptors extracted from the resource, with the selected descriptor being included in the post the social network. Furthermore, as users indicate selection of descriptors for a given resource over time, such selection information can be analyzed to refine the presentation of the descriptors as options for a subsequent user seeking to share the resource on the social network. In this manner, descriptor presentation can be crowdsourced to provide users with descriptor options that are more likely to be relevant or otherwise appropriate to their preferences.

Other aspects will become apparent from the following detailed description, taken in conjunction with the accompanying drawings.

BRIEF DESCRIPTION OF THE DRAWINGS

The disclosure may be understood by reference to the following description taken in conjunction with the accompanying drawings.

DETAILED DESCRIPTION

The following implementations describe methods, computer programs, and systems for crowdsourcing descriptor selection.

It will be apparent, that the implementations may be practiced without some or all of these specific details.

In the following description of various implementations of the disclosure, reference will be made to social networks. However, it should be appreciated that a social network is one example of a communication system, and that in other implementations, the principles and concepts described herein may be applied to any other type of communication system configured to provide the ability to communicate to others a summary of content including one or more descriptors that is visible to a multitude of users. Examples of such communication systems include the following: email systems used for mailing lists, group communication systems, automated RSS generation systems, commenting systems, bulletin board systems, etc.

Figure 1:
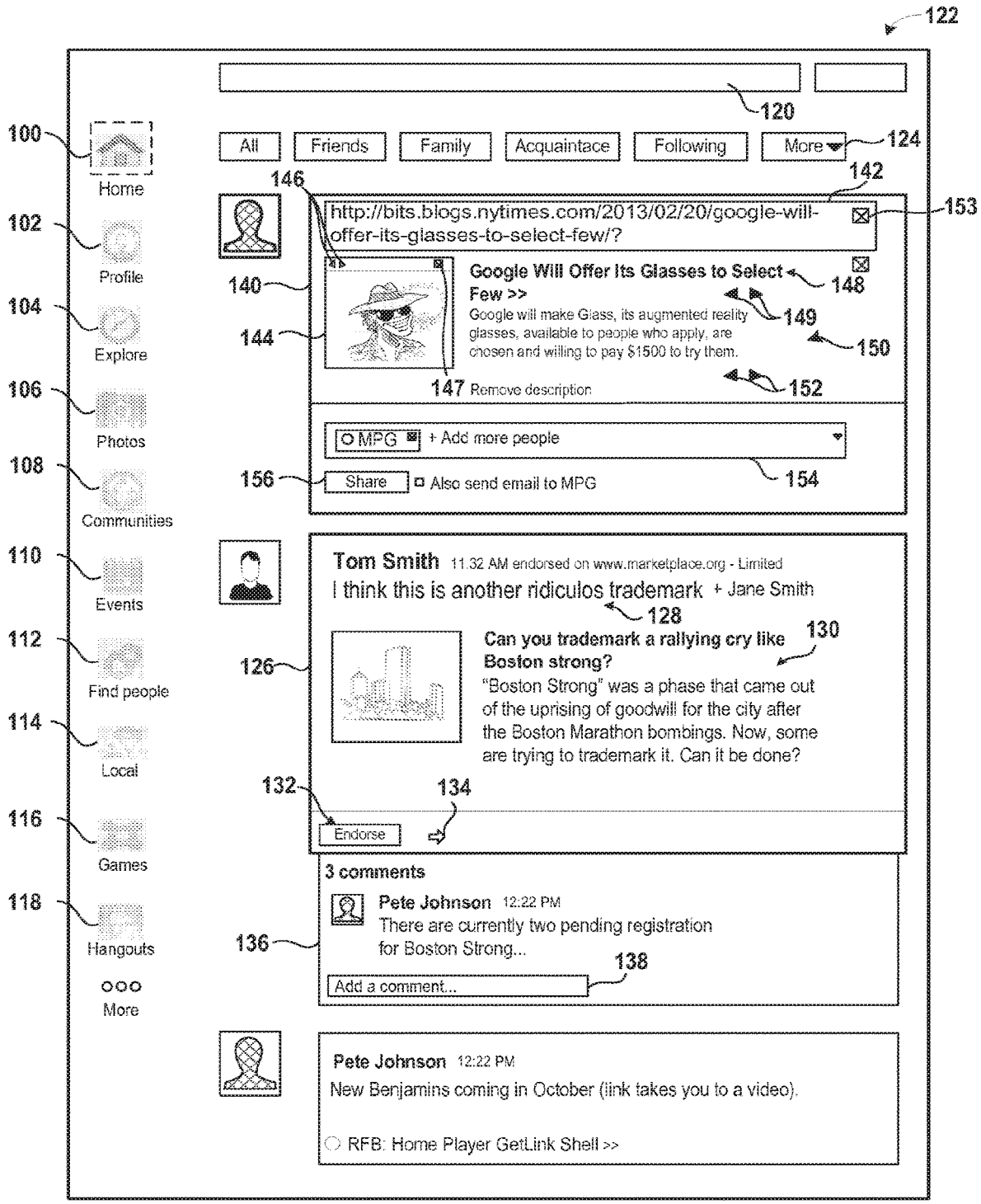
FIG. 1 illustrates an interface for interacting on a social network, in accordance with implementations of the disclosure.

FIG. 1 illustrates a social network interface for interacting on a social network, in accordance with implementations of the disclosure. The interface can be accessed from a client device, via any suitable application, e.g. a web browser, an app, a widget, a plugin, etc. It will be appreciated that some or all of the features of the social network interface shown and described herein may be included in accordance with various implementations. In other implementations, additional features can be provided as part of the social network interface. The illustrated interface is provided by way of example, and in various other implementations, the social network interface may have any configuration and incorporate any feature provided the interface supports the crowdsourced descriptor selection described herein.

In the illustrated implementation, the social network interface is shown to include various selectable icons which provide access to various features of the social network. A home icon 100 is currently selected to provide access to a default user view of the social network. In this default view, a feed area 122 can be configured to display posts, comments, and other items of interest, e.g. prioritizing those items generated by or associated with friends of the user on the social network. A profile icon 102 provides access to various features for viewing and editing the user's profile. These may include any of various kinds of settings relating to information shared about the user on the social network, e.g. privacy settings, a profile picture, settings governing the display of information to various classes of users including public, in network, or a friend users, etc. An explore icon 104 provides access to additional feed items that may be of interest to the user. By way of example, these can include posts by other users who are not necessarily connected to the current user, news articles, popular posts, videos, pictures, suggested groups, etc.

A photos icon 106 provides access to photos which have been uploaded by the user, and may also provide access to photos uploaded by other users which include the current user, e.g. in which the current user is tagged. A communities icon 108 provides access to groups or communities within the social network of which the current user may be a member. An events icon 110 provides access to information about various events which have been described or otherwise set up on the social network. For example, an event might be created on the social network when a given user accesses an event generation interface and provides information such as time/date, location, and description information. Invitations to users of the social network may also be sent for the generated event.

A people finder icon 112 provides access to features for enabling the current user to find other users of the social network to whom the current user is not already connected. This can entail accessing information from other accounts of the current user such as an e-mail account. A local icon 114 provides access to various local businesses, establishments, or other organizations having a presence on the social network. A games icon 116 provides access to various games which can be played on the social network. A video chat icon 118 provides access to a video chatting feature of the social network, which can facilitate video chats amongst multiple users simultaneously. Video chats can also be recorded and stored for later playback.

A search tool 120 can be provided as part of the social network interface to allow the user to enter keywords and search for items on the social network that may be related. It should be appreciated that search results can be prioritized in various ways, e.g. prioritizing results related to friends of the user. A feed control bar 124 includes various selectable options for determining what is shown in the feed area 122. By way of example, various subgroups of the current user's social graph can be defined, e.g. friends, family, acquaintances, others that the current user is following, etc. In one implementation, the feed control bar 124 can include options for presenting posts or other items from a given subgroup when selected. In this manner, the current user is able to tailor their view of the posts presented in the feed area 122 according to their personal preference. An option to present all posts can also be provided, for which posts from all of the various subgroups of the user social graph will be presented in the feed area 122. It will be appreciated that posts can be presented in an order based on any of various factors, e.g. time of posting, recency of comments, subgroup of the user social graph, popularity or endorsement of a post or item referenced by a post, etc.

A post 126 is shown in the feed are 122. The post 126 includes information identifying the user who generated the post (e.g. name or username), the time/date the post was generated, and may also include information relating to endorsement of the post by others. The post 126 includes a user-generated comment 128, which is defined by text entered by the user. The post 126 also includes a preview/summary 130 of an article available on the internet. The article preview 130 includes a picture from the article, as well as descriptive text from the article, e.g. the article's title, subtitle from the article, etc. An endorsement icon 132 can be selected by the current user to endorse the post 126 on the social network. A share icon 134 can be selected to facilitate sharing of the post to additional users of the social network specified by the current user. The post 126 can also include one or more comments 136, which are generated by users in response to the post and/or other comments, and associated with the post. A comment field 138 is provided for the current user to enter text to generate a new comment.

A posting interface 140 is provided for the current user to generate a new post on the social network. The posting interface 140 includes a text entry field 142 in which the user may enter text. When the text includes a reference to an internet resource (e.g. text includes a URL), the reference can be identified, and a preview of the internet resource can be populated within the posting interface 140, indicating how the preview will appear in the post when generated. The preview can include, by way of example, a picture 144, a title 148, and a description 150.

It will be appreciated that an internet resource can be any kind of file, data, article, or other information that is accessible over the internet. One example of an internet resource is a web page. For purposes of the disclosure, an item which can be included as part of the preview of an internet resource shall be referred to as a "descriptor" of the internet resource. A descriptor is defined by information that is representative of the internet resource, and may include portions of text or other types of information from the internet resource, such as image data, audio data, video data, etc. With reference to FIG. 1, each of the aforementioned picture 144, title 148, and description 150 are descriptors of an internet resource defining a news article.

While the term "preview" is utilized throughout the disclosure to refer to one or more descriptors of an internet resource included in a post, it should be appreciated that a preview may also be characterized as a "summary," "capsule," "synopsis," or other terminology which may be employed to refer to one or more descriptors of an internet resource in a post. It should also be appreciated that an internet resource can include or define any kind of content which can be accessed over the internet, e.g. text, images, audio, videos, posts, comments, articles, news, a map, a virtual environment (e.g. a three-dimensional environment in which a user may control the view), etc.

With continued reference to FIG. 1, each of the picture 144, title 148, and description 150, can be selected from various options. By way of example, selection icons 146 can be provided for facilitating selection of the picture 144. Selection of a selection icon 146 causes a different picture from the article to be displayed as the picture 144 to be included as part of the preview. In accordance with implementations described herein, the specific pictures or images from the article which are made available for selection, as well as the order in which they are presented (e.g. as a selection icon 146 is selected to display each successive picture according to the order), can be determined based on crowdsourced information. A cancellation icon 147 can be selected to remove the picture 144 from the preview entirely, such that when the post is generated, no picture of the article will be included as part of the preview.

In The title 148 can be selected from various options, which can be accessed by selection of the selection icons 149. The titles which are made available for selection, and their presentation order, can be determined based on crowdsourced information, in accordance with implementations of the disclosure. The possible titles can be determined based on analysis of the article, e.g. identifying the article's own designated title and other headlines or headers.

Additionally, the description 150 can also be selected from various options, which are determined based on analysis of the article. Selection icons 152 can be provided for allowing the user to view different options for the description. The description options can be portions of text extracted from the article, e.g. first or last sentences of paragraphs or the article as a whole, etc. The particular text portions presented as options, as well as their order of presentation (e.g. when the selection icons 152 are utilized), can be based on crowdsourced information, as further described in accordance with various implementations herein.

A cancellation icon 153 is provided, which when selected effects removal of the title 148 and description 150 from the preview, so that the title and description are not included as part of the article preview in the post when it is generated.

The posting interface 140 includes a field 154 in which the user may specify one or more users or groups of users to whom the post will be shared. A share button 156 is pressed to generate the post and share it with the specified users. The generated post will include text entered by the user in the text entry field 142 as well as the article preview which is defined based on the user's selections of its various portions.

Figure 2:
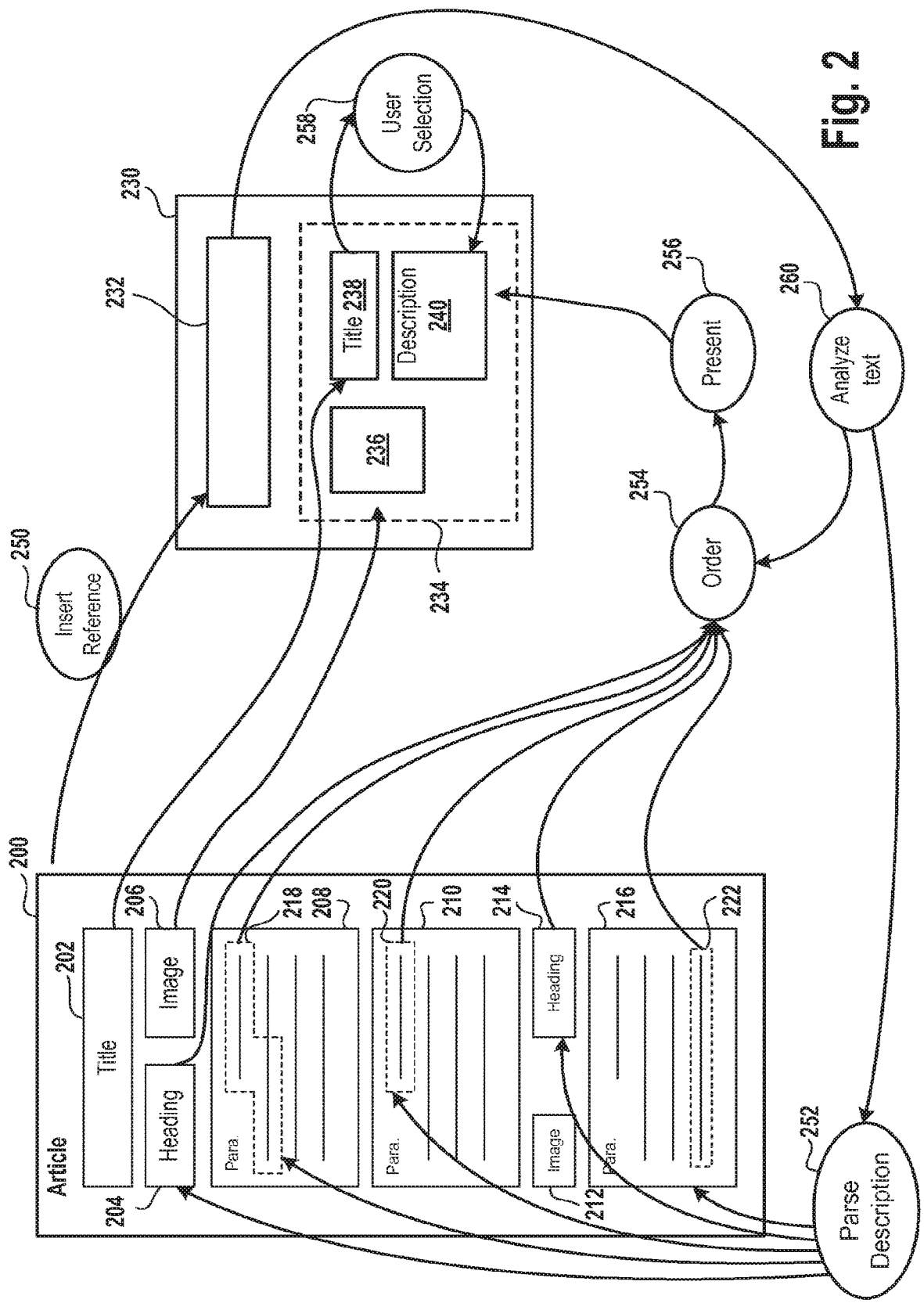
FIG. 2 conceptually illustrates how portions of an internet resource can be utilized to define a preview of the internet resource as part of a post to a social network, in accordance with implementations of the disclosure.

FIG. 2 conceptually illustrates how portions of an internet resource can be utilized to define a preview of the internet resource as part of a post to a social network, in accordance with implementations of the disclosure. An internet resource 200 is shown having various sections, including a title 202, a heading 204, an image 206, a paragraph 208, a paragraph 210, an image 212, a heading 214, and a paragraph 216. These sections, or portions of these sections, can be utilized to define a preview of the internet resource. By way of example, portion 218 of paragraph 208, portion 220 of paragraph 210, or portion 222 of paragraph 216 can be used to define a preview of the internet resource 200. In one implementation, the internet resource 200 is an article, though it will be understood that in other implementations, the internet resource can be any type of resource available over the internet.

A posting interface 230 for generating a post to a social network is shown to include a text entry field 232 and a preview interface 234. The preview interface 234 is configured to allow the user to select content from the internet resource for inclusion in the preview of the internet resource that will be included as part of the post to the social network when it is generated. The preview interface 234 includes an image interface 236, a title interface 238, and a description interface 240.

The image interface 236 is configured to allow the user to select an image from the internet resource 200, e.g. either of image 206 or image 212, to include in the preview. The title interface 238 is configured to allow the user to select a title for the preview. In one implementation, the title can be preselected from the internet resource, e.g. title 202. However, in other implementations, the title can be selected from other portions of text from the internet resource 200, e.g. headings, phrases, or sentences from the internet resource. The description interface 240 is configured to allow the user to select a text portion from the internet resource 200 to define a description as part of the preview.

With reference to the description interface 240, a procedure for crowdsourcing presentation/selection of a description, which is one example of a descriptor for the internet resource, is herein described. As indicated by reference 250, a user inserts a reference to the internet resource 200 in the text entry field 232. The reference to the internet resource is analyzed and identified. In one implementation, the internet resource 200 identified by the reference is parsed to identify descriptors, as indicated by reference 252. The descriptors can be portions of text from the internet resource, and may be identified according to various methods in accordance with various implementations of the disclosure.

By way of example, descriptors can be identified by parsing text from the internet resource that is set off by code-specific tags or other syntax. In a mark-up language such as HTML, these may take the form of HTML tags. Thus, if the internet resource defines an HTML document, then the HTML document can be parsed to identify specific HTML tags, and text defined within a given tag pair (or set off by a specific tag), or a portion of such text, can be identified as a descriptor for the internet resource. By way of example, text that may be identified as a descriptor from an HTML document may include the following: text defined by a title tag, text defined by heading tag, text defined by a body tag, etc. Additionally, specific portions of text may be identified, e.g. the first or last sentence or phrase from text defined by a body tag. In some implementations, the location of text relative to other content within a document may be indicative of its utility as a descriptor. For example, text from a heading or body tag immediately preceding or proceeding an image may be identified as a descriptor (e.g. such text may be a caption or otherwise descriptive of the image).

Additionally, descriptors can be identified based on semantic or linguistic analysis of text, including analysis of keywords, pronouns, phrases, sentences, etc. It should be appreciated that any method of semantic or linguistic analysis can be utilized to identify descriptors, in accordance with implementations of the disclosure.

Furthermore, it should be appreciated that other types of content other than text, such as multimedia content, may be identified based on recognition of tags in a document, and such content can be classified as a descriptor of the document. While the above-mentioned implementations have generally been described with reference to HTML documents, it should be appreciated that similar principles can be applied to any kind of document or other internet resource which is parsed to identify descriptors. In various implementations, any kind of identifiable marker, tag, or characteristic of content within a document can be utilized as a basis for identifying a descriptor. For example, font characteristics (e.g. font size, bold, italics, highlighted, etc.) may be analyzed to identify descriptors, e.g. text having a certain font characteristic, or having a font characteristic that differs from surrounding or other document text in a certain manner, may be identified as a descriptor.

A priority order is determined for the descriptors which have been parsed from the internet resource 200, indicated by reference 254 in the illustrated implementation. The priority order defines the order in which the descriptors will be presented via the preview interface 234. With reference to the description interface 240, those descriptors which are potential descriptions of the internet resource, are presented via the description interface 240, as indicated by reference 256. By way of example, the user may click on a button in the description interface 240 which causes each potential description to be displayed in turn according to the priority order. (An alternative button may reverse the display process.) Thus, the user selection process 258 whereby the user selects a particular description to include in the preview of the internet resource may entail receiving inputs from the user to display various potential descriptions until the user arrives at a description with which he/she is satisfied.

It should be appreciated that the priority order can be based on a variety of factors. The priority order can be crowdsourced; that is determined at least in part based on previous selections by users. For example, in some implementations, descriptors are prioritized based on popularity of selection in previously generated posts which include previews of the internet resource. Furthermore, the priority order can be determined based on features of the user, e.g. location, age, gender, historical social network activity, etc. In some implementations, the priority order can be based on features of members of the user's social graph.

As a user interacts with the posting interface 230, they may enter text into the text entry field 232 (in addition to the reference to the internet resource). This text can be analyzed, as indicated by reference 260, and utilized in various ways. For example, the text can be analyzed to identify keywords, pronouns, key phrases, or any other portion of the text indicative of its significance. Such analysis can be applied to affect the previously described priority order of the descriptors. For example, in one implementation, keywords identified from the text may be applied so that descriptors that include more of the identified keywords are prioritized over descriptors having fewer or none of the keywords.

Additionally, in some implementations, the analysis of text entered in the text entry field 232 can be applied to affect the identification of descriptors from the internet resource 200. For example, descriptors can be identified at least in part based on identifying keywords within the internet resource that have previously been identified from analyzing the text entered in the text entry field 232.

In the above-described implementation, the reference to the internet resource is entered by the user, e.g. by cutting and pasting a URL into the text entry field 232. However, in other implementations, the reference to the internet resource may be identified in other ways. For example, a social widget can be integrated into the internet resource, which defines an interface for sharing the internet resource on a social network. When a user activates the social widget to initiate sharing of the internet resource on the social network, the social widget communicates the identity of the internet resource (e.g. the URL of the internet resource or another predefined identifier for the internet resource). In this manner, the preview interface 234 is populated with selection options from the appropriate internet resource.

Figure 3:
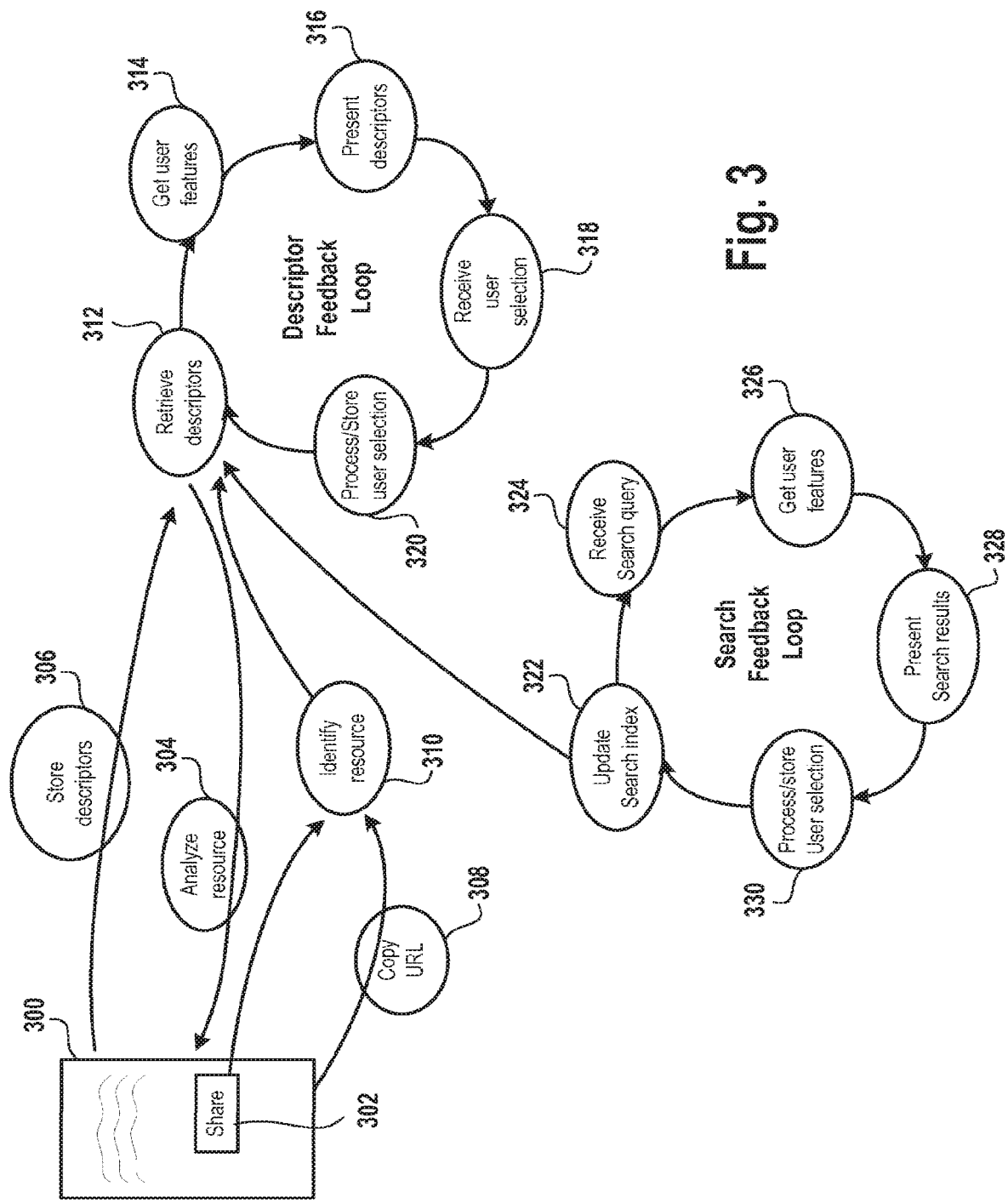
FIG. 3 is a flow diagram conceptually illustrating how descriptor functionality and internet search functionality can be utilized in conjunction with each other, in accordance with implementations of the disclosure.

FIG. 3 is a flow diagram conceptually illustrating how descriptor functionality and internet search functionality can be utilized in conjunction with each other, in accordance with implementations of the disclosure. A resource 300 can be an internet resource or any other kind of resource accessible over a network. The resource 300 can be analyzed, as indicated by operation 304, to identify descriptors which are indicative of the content of the resource 300. The descriptors can be stored, as indicated by operation 306, for later retrieval.

As indicated by operation 308, in some implementations a user may copy a reference (e.g. URL) to the resource 300 and enter it in a posting interface for generating a post on a social network. Based on analysis of the reference, the resource can be identified, indicated at operation 310. As indicated at operation 312, descriptors for the identified resource are retrieved, either from previously stored descriptors or based on real-time analysis of the resource. In other implementations, a share button 302 presented as part of the resource might be activated, the share button configured to facilitate sharing of the resource on the social network. Thus, the share button 302, when activated, indicates the resource to be shared, and based on the indication, descriptors for the resource can be retrieved.

At operation 314, user features are obtained. The user features may include any of various characteristics of the user, including demographic information, social graph information, and other user-related information. At operation 316, the descriptors are presented to the user for selection. The presentation can be based on historical selection data by other users, and may also be based on the aforementioned user features identified for the specific user. In various implementations, the specific selection of descriptors made available for presentation and/or the order of presentation of descriptors can be determined based on such considerations.

At operation 318, a user selection of the descriptors is received, indicating which of the possible descriptors is included in a resource preview when the post is generated. At operation 320, the user selection is processed and stored. More specifically, the user selection is stored to identify the descriptor included as part of the resource preview in the post. When another user views the generated post, the post will include the selected descriptor, thereby providing the viewing user with an indication of the contents of the resource. The descriptor as it is presented in the post may include a link to the resource, so that by selecting the descriptor, the viewer may navigate to the resource itself. Additionally, the user selection of the descriptor is processed to define historical descriptor selection data, e.g. by adding to a count of the number of times users have selected the particular descriptor for a preview of the resource. In this manner, historical descriptor selection data is accumulated as users indicate selections of descriptors over time. Additionally, a particular descriptor selection may be stored in association with other data, e.g. time of day, geographic location, demographic data of the user, other user feature data, etc.

In some implementations, the user selection of a descriptor can be processed to update a search index, as indicated at operation 322. A search index contains data about resources or documents (e.g. parsed from the resources or documents) to facilitate fast and accurate information retrieval. A search engine receives a query, and searches within the search index to identify resources or documents which are relevant to the query. It will be appreciated that in addition to text segments, a search query can be defined by a complete document, an image or portion thereof, a video or portion thereof, or other types of information for which a search engine may be defined to retrieve relevant search results.

By way of example, the operation of a search engine is shown in the illustrated implementation. At operation 324, a search query is received by the search engine. At operation 326, user features are obtained, which may provide additional context for the search operation to be performed. At operation 328, search results are obtained and presented to the user. At operation 330, user selection from amongst the presented search results is processed and stored. The user selection from the search results can be utilized to update the search index at operation 322, as for a given query or subset thereof, the user selection from amongst several search results provides an indication of the relevance of the search results to the query as intended by the user.

As noted, user selection of a descriptor for a given resource can be utilized to update the search index, as the user selection of a descriptor provides an indication of the subject matter and relevance of the resource. Furthermore, in some implementations, the search index can be utilized to affect the descriptor presentation process described above. For example, the analysis and storage of descriptors for a given resource can be based, at least in part, on information relating to the resource contained in the search index. Furthermore, the retrieval and presentation of descriptors can also be based, at least in part, on information about the resource contained in the search index.

A search index defined for a given resource may be updated in various ways based on user selection of descriptors. For example, a weight for one or more search terms associated with the resource can be adjusted or assigned based on the popularity of descriptors of the resource as determined based on the user selection. Additionally, a selection of "snippets" utilized to describe the resource as a search result can be updated. (A "snippet" will be understood by those skilled in the art as a portion of a resource that can be displayed (e.g. in combination with a reference to the resource) in a listing of search results. The snippet may be chosen to highlight a portion of the resource that is relevant to the search query. For example, in a text-based search, a snippet may include keywords or search terms defined from the original search query.)

As shown in the illustrated implementation, each of the descriptor process and the search process define respective feedback loops, wherein user selection from a plurality of presented options is processed to affect future presentation of options. The results from descriptor selection and from search result selection can be utilized in a cross-functional manner to influence each other for a given resource, as each provides indications of the subject matter and relevance of the given resource.

Figure 4:
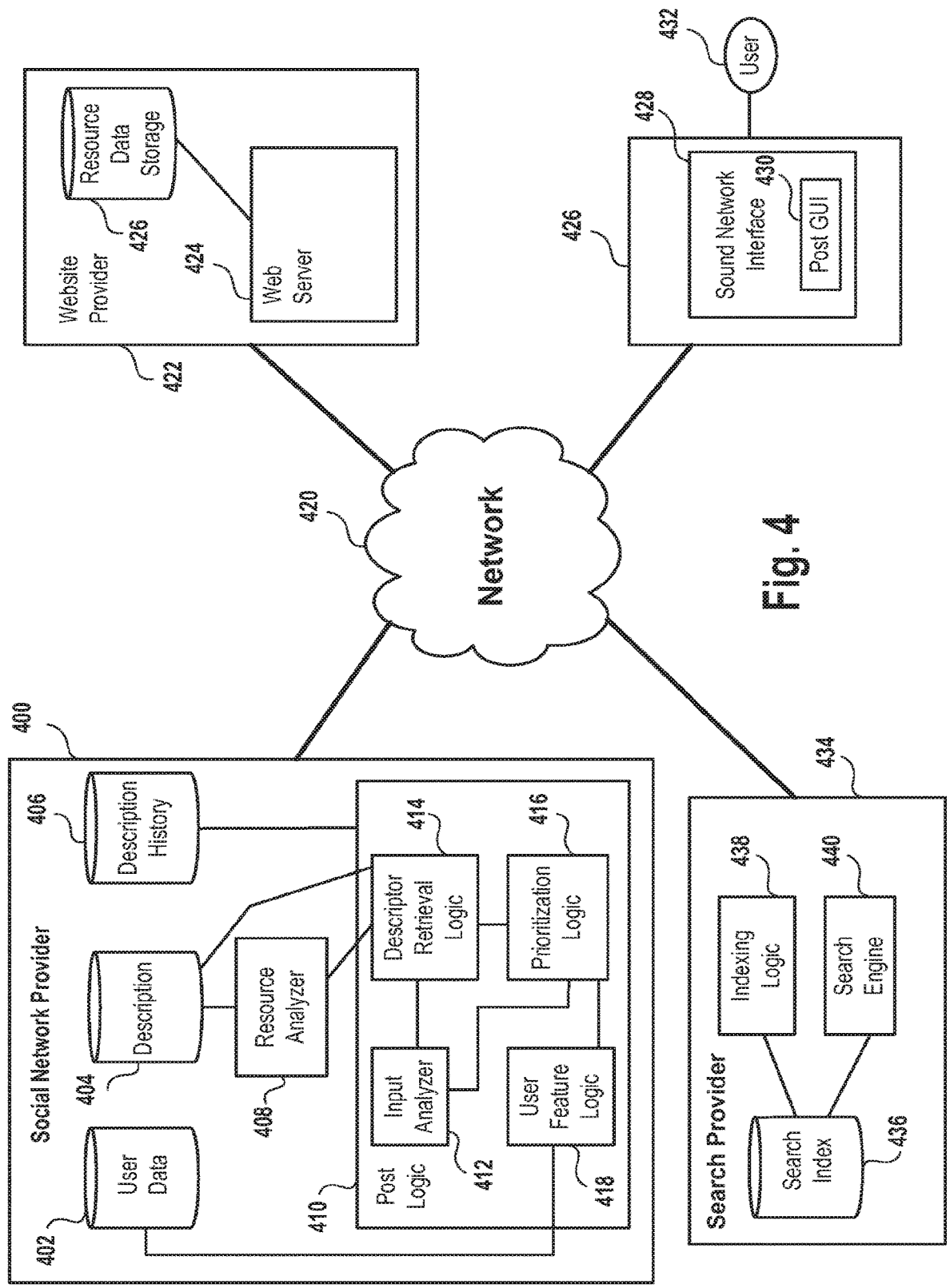
FIG. 4 illustrates a system for processing descriptor selection for a post to a social network, in accordance with implementations of the disclosure.

FIG. 4 illustrates a system for processing descriptor selection for a post to a social network, in accordance with implementations of the disclosure. A social network provider 400 manages a social network, including providing access to users of the social network and facilitating activity on the social network. The social network provider communicates over a network 420 to a client device 426 operated by a user 432. At the client device 426, a social network interface 428 is provided to enable the user 432 to interact on the social network. The social network interface 428 can be provided in various ways in accordance with implementations of the disclosure, e.g. via a dedicated app or application configured to run in the operating system environment of the client device 426, via a web browser accessing the social network's website, etc.

The social network provider 400 includes post logic 410 for generating a post to the social network. The post logic 410 communicates with a post interface 430 on the client device 426 to enable the user 432 to define the contents of a new post. The post logic 410 includes an input analyzer 412 configured to analyze input from the user (e.g. received via the post interface 430), identifying a reference to a resource if included, and analyzing other text entered by the user. In some implementations, the resource can be provided by a website provider 422. The website provider 422 may be defined by a web server 424, and resource data storage 426. Third parties such as the social network provider 400 communicate with the web server 424 to access a given resource. The web server 424 may assemble and deliver a requested resource based on data stored in the resource data storage 426.

When a reference to a resource is provided and identified, descriptor retrieval logic 414 retrieves descriptors for the identified resource. If the resource has already been analyzed to determine descriptors stored in a descriptor storage 404, then the predetermined descriptors are retrieved from the descriptor storage 404. A resource analyzer 408 is configured to analyze a resource to determine descriptors for the resource that can be stored in the descriptor storage 404. If an identified resource has not been previously analyzed to determine descriptors, then the descriptor retrieval logic may trigger the resource analyzer to analyze the identified resource to determine descriptors. Prioritization logic 416 determines a priority order according to which the retrieved descriptors are presented in the post interface 430.

A descriptor history 406 includes historical descriptor selection data for various resources. In some implementations, this historical descriptor selection data can be utilized to determine which descriptors are retrieved by the descriptor retrieval logic 414, as well as the priority order determined by the prioritization logic. Additionally, a user data storage 402 includes data about users of the social network, including the user 432. In some implementations, such user data can be utilized to determine which descriptors are retrieved by the descriptor retrieval logic 414, as well as the priority order determined by the prioritization logic 416. In one implementation, a user feature logic 418 is provided for determining features of the user 432 which are then utilized by the prioritization logic 416 to determine the priority order of the retrieved descriptors.

In some implementations, a search provider 434 interacts with the social network provider to provide additional functionality based on user selection of descriptors. The search provider includes a search index 436, which is managed by indexing logic 438. The indexing logic can be configured to receive information about user selection of descriptors associated with a given resource, and utilized such information to update portions of the search index 436 which pertain to the given resource. The quality of search results returned by a search engine 440 in response to a search query are therefore improved as the search index is defined based in part on a crowdsourced understanding of the significance of a given resource.

Figure 5A:
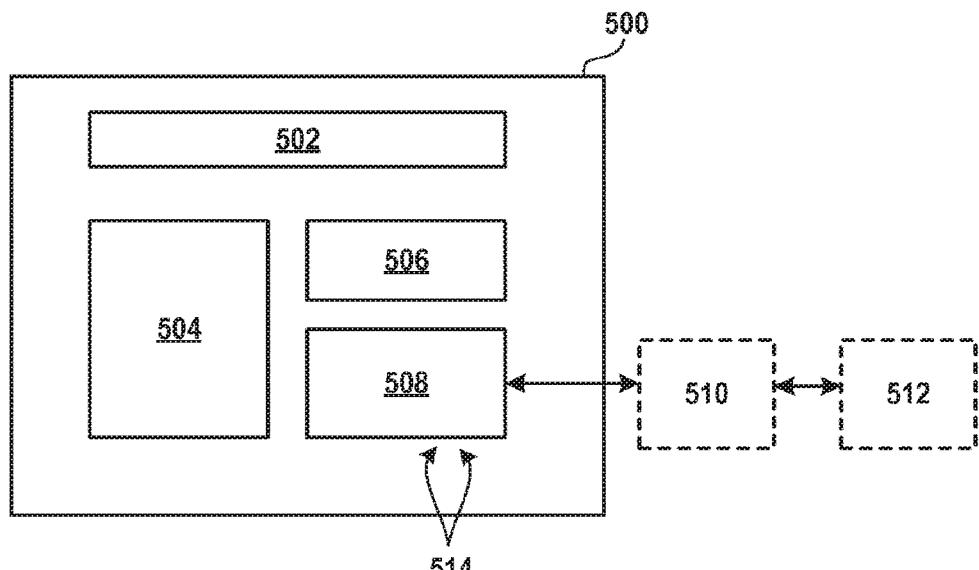
FIG. 5A illustrates an interface for defining a post to a social network, in accordance with implementations of the disclosure.

FIG. 5A illustrates an interface for defining a post to a social network, in accordance with implementations of the disclosure. The post interface 500 includes a text entry field 502, for receiving text entered by a user of the social network. Additionally, the post interface 500 includes various predefined locations 504, 506, and 508, where descriptors of a given resource to be shared as part of the post can be previewed and selected. In some implementations, the location 504 is defined for display of an image from the resource. In some implementations, the location 506 is defined for display of a title descriptor for the resource. In some implementations, the location 508 is defined for display of a summary descriptor for the resource. By way of example, selection of a summary descriptor for the location 508 can be facilitated by user activation of arrows 514, which allow the user to populate various summary descriptor options into the location 508. In the illustrated implementation, in addition to a default summary descriptor, there may be additional summary descriptors 510 and 512, from which the user may select one summary descriptor to be defined as part of the post. In another implementation, the user may select from the various descriptor options by swiping the location 508 in a given direction, when it is displayed on a touchscreen responsive to gesture input.

Figure 5B:
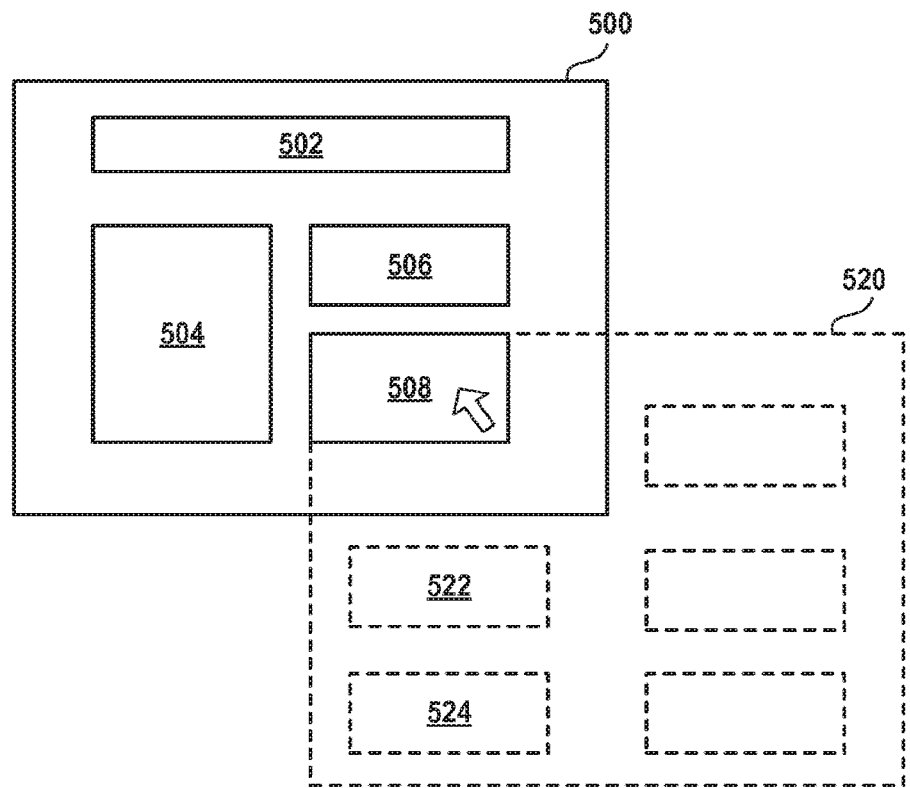
FIG. 5B illustrates an interface for defining a post to a social network, in accordance with implementations of the disclosure.

FIG. 5B illustrates an interface for defining a post to a social network, in accordance with implementations of the disclosure. The post interface 500 is shown to include similar features as that discussed with reference to FIG. 5A. In FIG. 5B, a pointer is hovered over the predefined location 508, whereupon an options view 520, including several options for the summary descriptor to be populated in the location 508, is shown. The options view 520 presents various summary descriptors, including descriptors 522 and 524, from which the user may select one to be defined at the location 508 as part of the post to the social network when it is generated.

Figure 6:
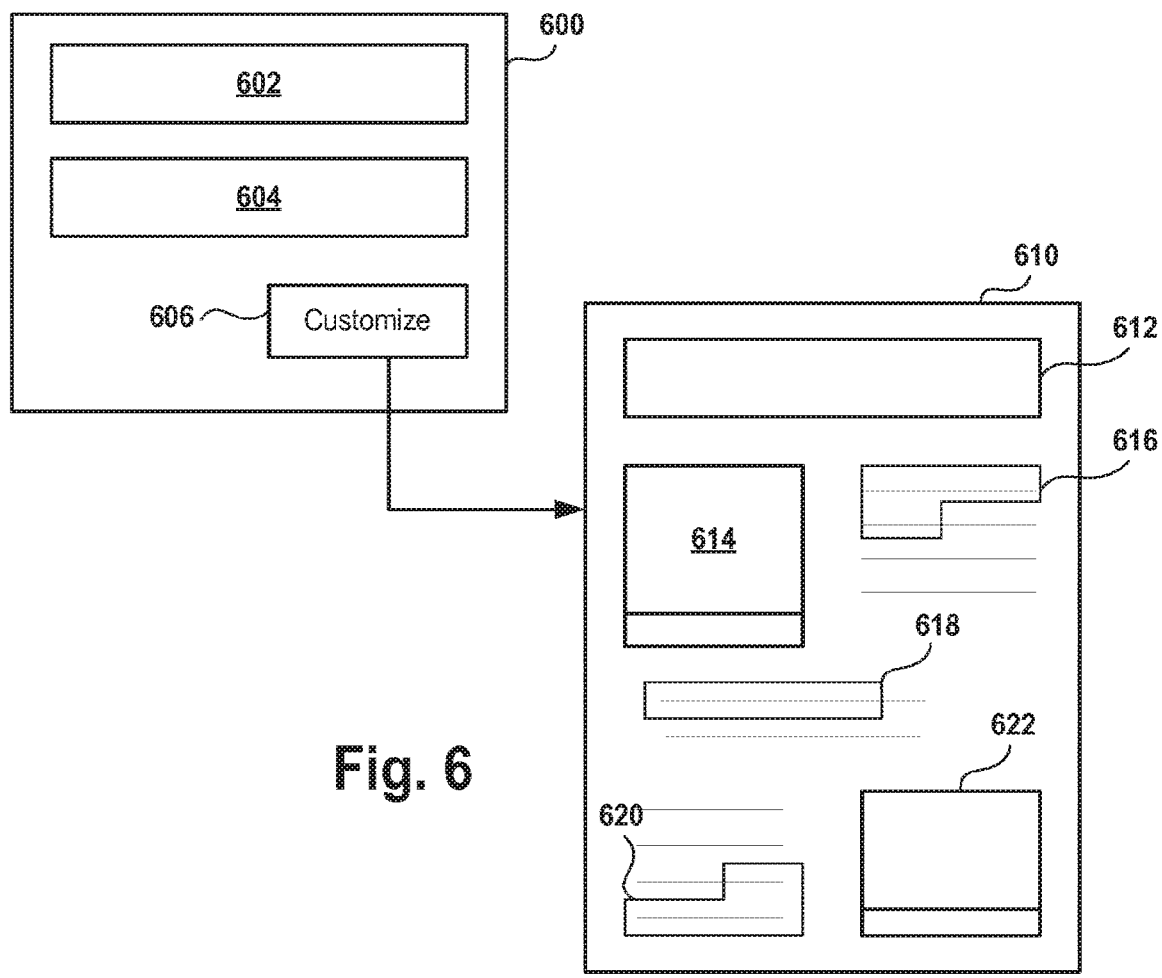
FIG. 6 illustrates a post interface having a customization option for defining a post to a social network, in accordance with implementations of the disclosure.

FIG. 6 illustrates a post interface having a customization option for defining a post to a social network, in accordance with implementations of the disclosure. The post interface 600 includes a text entry field 602 for receiving text entered by a user. A descriptor location 604 is defined for a descriptor of a resource to be previewed. In one implementation, a button 606 provides access to an option to customize the descriptor defined for the descriptor location 604. By way of example, triggering the button 606 may provide access to a view 610 of the resource, with portions of the resource available for selection. In the illustrated implementation, these include portion 612, 614, 616, 618, 620, and 622. In one implementation, the portion 612 is a title of the resource.

In one implementation, the portion 614 and 622 are images defined as part of the resource. In one implementation, the portions 616, 618, and 620, are portions of text contained within the resource. A user may select from amongst the predefined portions of the resource shown in the view 610, and thereby customize the descriptor utilized to populate the location 604, and which will be included in the post to the social network.

Figure 7:
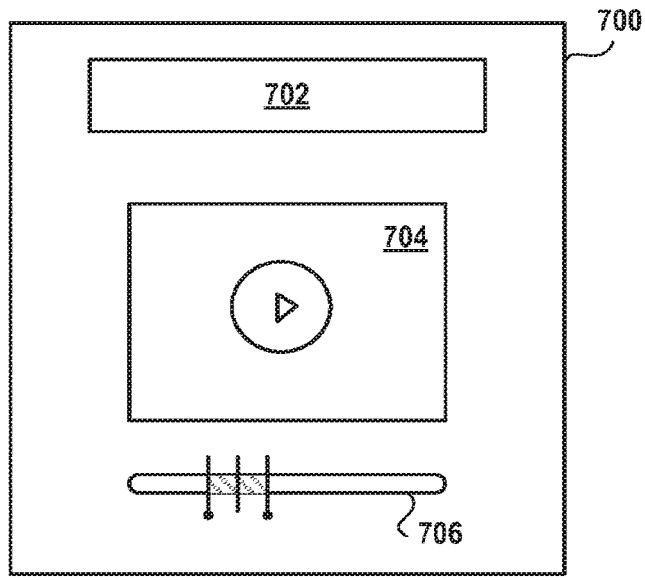
FIG. 7 illustrates a post interface for defining a post to a social network including a video, in accordance with implementations of the disclosure.

FIG. 7 illustrates a post interface for defining a post to a social network including a video, in accordance with implementations of the disclosure. The post interface 700 includes a text entry field 702 for receiving text entered by a user. By way of the example, the user may enter text including a reference to a video. The reference is analyzed and a preview of the video can be displayed at the location 714 in the post interface 700. In one implementation, a slider bar 706 provides a mechanism whereby the user may select a representative frame from the video to be displayed at the location when the post is generated. In another implementation, the slider bar 706 can enable the user to select a portion of the video to be shown or made available for viewing from within the post when it is generated.

Though some implementations have been described with reference to particular types of descriptors defined for specific resource types, in other implementations, the concepts described herein may be applied to other types of descriptors and/or resources. For example, a descriptor may be defined by a selection of a region of an image or an excerpt from a video. An automated system may identify objects within the image to summarize the content, or may select excerpts from the video based on the audio track or the visible objects in the frames. In the case of an image, such a system may be configured to inspect the image and select subimages from it. By way of example, for a photo in which there are two people and a dog, the system may identify the faces of the people and the dog, and allow the user to select the subimage of either person's face or the subimage of the dog as a descriptor for the image itself or for a larger document of which the image is a part.

Figure 8:
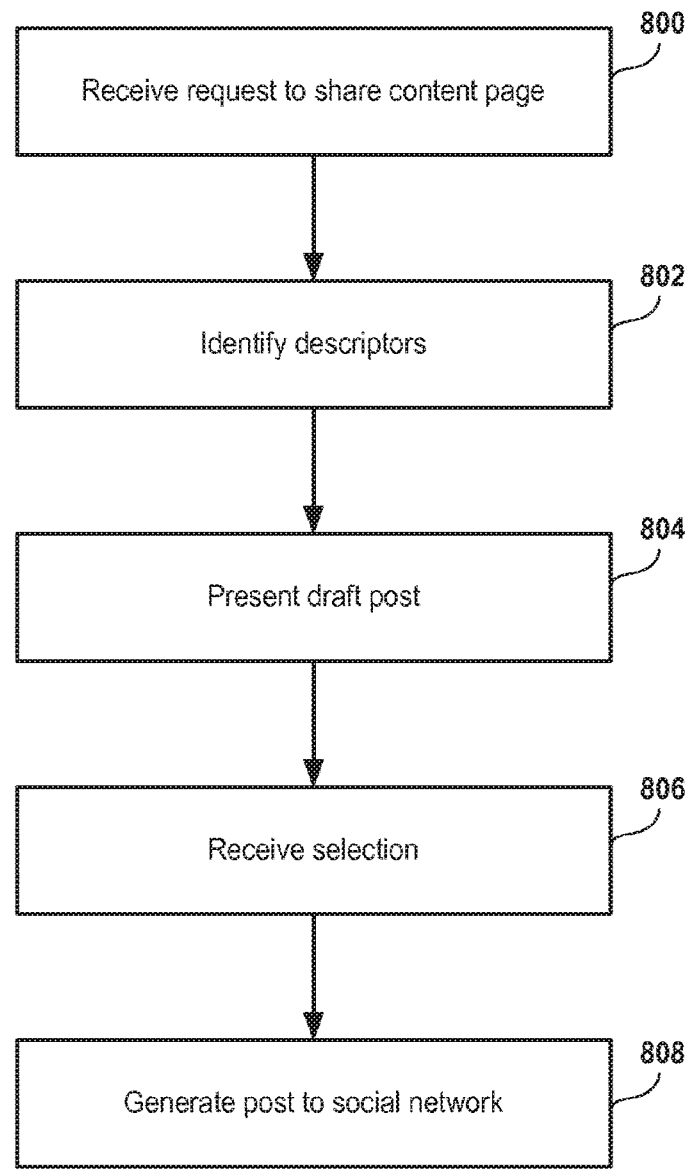
FIG. 8 illustrates a method for sharing a resource to a social network, in accordance with implementations of the disclosure.

FIG. 8 illustrates a method for sharing a resource to a social network, in accordance with implementations of the disclosure. At operation 800, a request to share a content page in a post to a social network site is received. At operation 802, the content page is analyzed to identify a plurality of descriptive content. At operation 804, a draft post is presented, the draft post providing options for associating particular ones of the descriptive content for integration with the post. At operation 806, a selection of at least one of the particular ones of the descriptive content is received. At operation 808, the post to the social network site is generated based on the selection.

Figure 9:
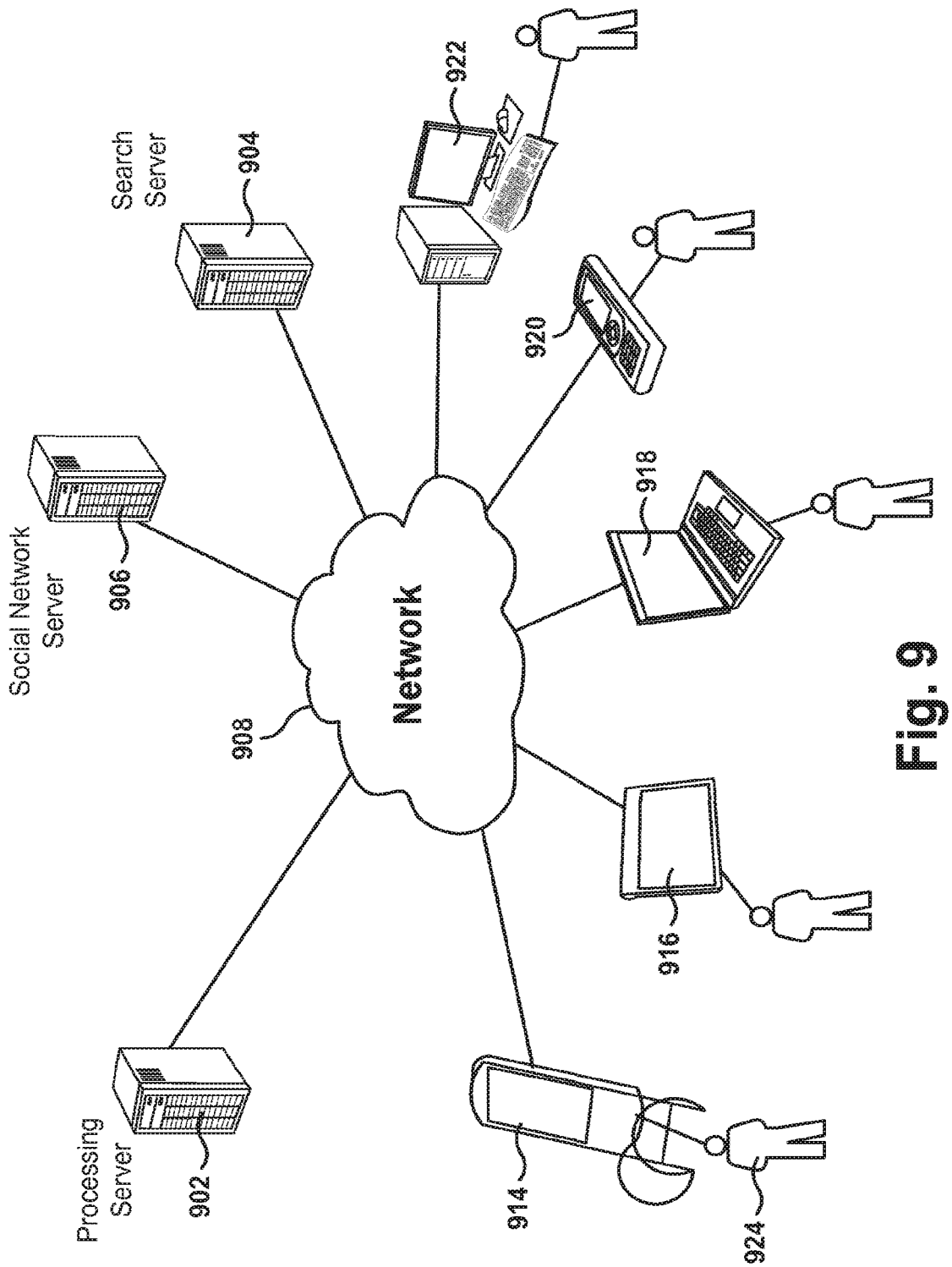
FIG. 9 illustrates an example architecture of a system for implementing implementations of the disclosure, in accordance with implementations of the disclosure.

FIG. 9 provides one example architecture of a system that may utilize implementations described herein. Users 924 interact with each other in the context of a social network, where users can include real people and entities. Each user has an account in the social network, and the account includes at least a user name. In addition, each account can include a profile of the user with additional information about the user, e.g., birth date, residence, favorite activities, etc. The user can be in control of what information is added to the profile, and what information is shared with others. A user may access the social network through different devices, e.g., a smart phone 914, a tablet computer 916, a laptop 918, a mobile phone 920, a personal computer 922, or any computing device that provides access to the Internet. Of course, the illustrated devices are only examples.

In accordance with some implementations, social network server 906 delivers services that enable users to interface with each other. The social network provides a site that enables users to define user accounts, which can be accounts for people and entity accounts. Through those accounts, users are able to connect with their friends, group of friends, entities, groups of entities, etc. In some implementations, the relationships established in the social network may be utilized in other contexts. Processing server 902 can be configured to perform various additional functions related to the social network, e.g., executing applications which run within the social networking environment, or processing data relating to external sites which have integrated social functionality. Search server 904 provides Internet search capabilities.

It is noted that the implementations illustrated in FIG. 9 are illustrative of certain implementations. Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 9 should therefore not be interpreted to be exclusive or limiting, but rather illustrative.

Figure 10:
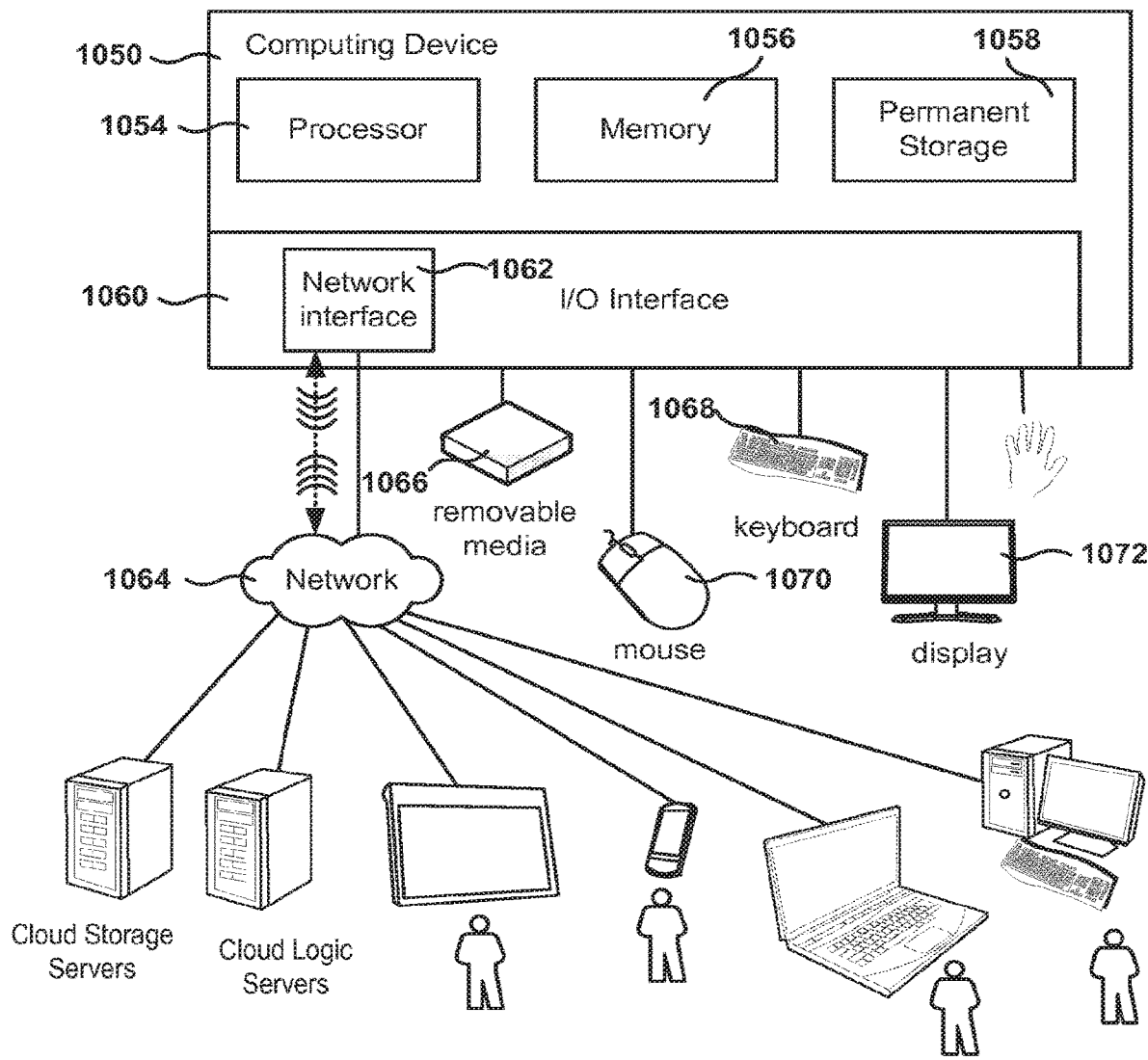
FIG. 10 is a schematic diagram of a computer system for implementing implementations of the disclosure.

FIG. 10 is a schematic diagram of a computer system for implementing implementations of the present disclosure. It should be appreciated that the methods described herein may be performed with a digital processing system, which in one implementation may be a conventional, general-purpose computer system. Special purpose computers, which are designed or programmed to perform only one function, may be used in the alternative. The computing device 1050 includes a processor 1054, which is coupled through a bus to memory 1056, permanent storage 1058, and Input/Output (I/O) interface 1060.

Permanent storage 1058 represents a persistent data storage device, e.g., a hard drive or a USB drive, which may be local or remote. Network interface 1062 provides connections via network 1064, allowing communications (wired or wireless) with other devices. It should be appreciated that processor 1054 may be embodied in a general-purpose processor, a special purpose processor, or a specially programmed logic device. Input/Output (I/O) interface 1060 provides communication with different peripherals and is connected with processor 1054, memory 1056, and permanent storage 1058, through the bus. Sample peripherals include display 1072, keyboard 1068, mouse 1070, removable media device 1066, etc.

Display 1072 is configured to display the user interfaces described herein. Keyboard 1068, mouse 1070, removable media device 1066, and other peripherals are coupled to I/O interface 1060 in order to exchange information with processor 1054. It should be appreciated that data to and from external devices may be communicated through I/O interface 1060 Implementations of the disclosure can also be practiced in distributed computing environments where tasks are performed by remote processing devices that are linked through a wired or a wireless network.

Implementations of the disclosure can be fabricated as computer readable code on a non-transitory computer readable storage medium. The non-transitory computer readable storage medium holds data which can be read by a computer system. Examples of the non-transitory computer readable storage medium include permanent storage 1058, network attached storage (NAS), read-only memory or random-access memory in memory module 1056, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Implementations presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 1064. Network 1064 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other utilized at least a processor and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims

What is claimed is:

1. A method, comprising:
 receiving, by a processor, a reference to an internet resource from a device, wherein the reference to the internet resource is a uniform resource locator (URL) provided in a post interface, wherein the post interface presents posts to a social network;
 identifying, by the processor, a plurality of descriptors indicative of content within the internet resource, wherein each of the plurality of descriptors comprises a plurality of options that are associated with a priority order, wherein each of the plurality of options has an associated popularity metric, and wherein the plurality of options are identified in accordance with associated popularity metrics;
 sending, by the processor, an identified option for each of the plurality of descriptors to the device for presentation in the post interface according to the priority order;
 receiving, via the post interface, a first user selection of one of the plurality of descriptors;
 receiving, via the post interface, a second user selection of an icon for the one of the plurality of descriptors, wherein the second user selection causes a next successive option in the plurality of options for the one of the plurality of descriptors to be displayed; and
 generating, by the processor, a post to the social network, wherein the generated post is populated with the identified option for the plurality of descriptors corresponding to the user selection.

2. The method of claim 1, wherein the URL is received from the post interface presented on the device.

3. The method of claim 1, wherein the plurality of descriptors are identified based on characteristics of content parsed from the internet resource, and wherein the content parsed from the internet resource comprises a portion of text extracted from the internet resource.

4. The method of claim 1, wherein generating the post further comprises processing the selection of the one of the plurality of descriptors to update the popularity metric associated with the selected one of the plurality of descriptors.

5. The method of claim 4, wherein the priority order for the plurality of descriptors is based on the popularity metrics associated with the plurality of descriptors.

6. The method of claim 1, further comprising:
 retrieving features associated with an identified user;
 wherein the priority order for the plurality of descriptors is based on the features associated with the identified user.

7. The method of claim 6, wherein the features associated with the identified user include at least one of age, gender, or location.

8. The method of claim 1, further comprising:
 receiving, from the post interface, user-defined text; and
 adjusting the priority order for the plurality of descriptors based on the user-defined text.

9. The method of claim 1, further comprising updating a search index defined for the internet resource based on the selected one of the plurality of descriptors.

10. An apparatus, comprising:
 a memory; and
 a processing device communicably coupled to the memory, the processing device to:
  receive a request to share a content page in a published post to a social network;
  identify a plurality of descriptors indicative of content within the content page, wherein each of the plurality of descriptors comprises a plurality of options that are associated with a priority order, wherein each of the plurality of options has an associated popularity metric, and wherein the plurality of options are identified in accordance with associated popularity metrics;

send an identified option for each of the plurality of descriptors to the device for presentation in the post interface according to the priority order;

receive, via the post interface, a first user selection of one of the plurality of descriptors;

receive, via the post interface, a second user selection of an icon for the one of the plurality of descriptors, wherein the second user selection causes a next successive option in the plurality of options for the one of the plurality of descriptors to be displayed; and generate a post to the social network, wherein the generated post is populated with the identified option for the plurality of descriptors corresponding to the user selection.

11. The apparatus of claim 10, wherein receiving the request to share the content page further comprises receiving and identifying a uniform resource locator (URL) for the content page.

12. The apparatus of claim 10, wherein the plurality of descriptive content is identified based on characteristics of content parsed from the content page, and wherein the content parsed from the content page comprises one or more mark-up tags in data defining the content page.

13. The apparatus of claim 10, wherein the processing device is further to retrieve features associated with an identified user, wherein the priority order for the plurality of descriptive content is based on the features associated with the identified user.

14. The apparatus of claim 10, wherein the processing device to generate the post further comprises the processing device to utilize the selection of the least one of the plurality of descriptive content to update the popularity metric associated with the one of the plurality of descriptors corresponding to the first user selection.

15. The apparatus of claim 14, wherein the priority order for the plurality of descriptive content is based on the popularity metrics associated with the plurality of descriptive content.

16. A non-transitory computer readable storage medium comprising program instructions that, when executed by a processor, cause the processor to:

provide, by a processor of a user device, a post interface in a graphical user interface (GUI) on the user device, wherein the post interface facilitates generation of posts to a social network;

transmit a reference to an internet resource to a server device, wherein the reference to the internet resource is a uniform resource locator (URL) provided in the post interface;

receive, by the processor, a plurality of descriptors for presentation in the post interface and a priority order for the plurality of descriptors, wherein the plurality of descriptors are indicative of content within the internet resource, wherein each of the plurality of descriptors comprises a plurality of options that are associated with the priority order, wherein each of the plurality of options has an associated popularity metric, and wherein the plurality of options are identified in accordance with associated popularity metrics;

receive an identified option for each of the plurality of descriptors;

present the plurality of descriptors and the identified option for each of the plurality of descriptors according to the priority order in the post interface;

transmit, to the server device, a first user selection of one of the plurality of descriptors, the selection received via the post interface;

transmit, to the server device, a second user selection of an icon for the one of the plurality of descriptors, wherein the second user selection causes a next successive option in the plurality of options for the one of the plurality of descriptors to be displayed;

receive, by the processor, a post to the social network, the post generated based on the identified option for the plurality of descriptors corresponding to the user selection; and present, via the GUI, the post to the social network.

17. The non-transitory computer readable storage medium of claim 16, wherein the plurality of descriptors are identified based on characteristics of content parsed from the internet resource, and wherein the content parsed from the internet resource comprises a portion of text extracted from the internet resource.

18. The non-transitory computer readable storage medium of claim 16, wherein generating the post further comprises processing the selection of the one of the plurality of descriptors to update the popularity metric associated with the selected one of the plurality of descriptors, and wherein the priority order for the plurality of descriptors is based on the popularity metrics associated with the plurality of descriptors.

19. The non-transitory computer readable storage medium of claim 16, wherein the priority order for the plurality of descriptors is based on features associated with an identified user.

20. The non-transitory computer readable storage medium of claim 16, wherein the processor is further to transmit user-defined text received via the post interface, wherein the priority order for the plurality of descriptors is adjusted based on the user-defined text.

* * * * *